US007684578B2

(12) United States Patent
Roeder et al.

(10) Patent No.: US 7,684,578 B2
(45) Date of Patent: *Mar. 23, 2010

(54) WAVE FIELD SYNTHESIS APPARATUS AND METHOD OF DRIVING AN ARRAY OF LOUDSPEAKERS

(75) Inventors: Thomas Roeder, Rockhausen (DE); Thomas Sporer, Fuerth (DE); Sandra Brix, Ilmenau (DE)

(73) Assignee: Fraunhofer-Gesellschaft zur Foerderung der Angewandten Forschung E.V. (DE)

( * ) Notice: Subject to any disclaimer, the term of this patent is extended or adjusted under 35 U.S.C. 154(b) by 1131 days.

This patent is subject to a terminal disclaimer.

(21) Appl. No.: 11/305,546

(22) Filed: Dec. 16, 2005

(65) Prior Publication Data

US 2006/0098830 A1 May 11, 2006

Related U.S. Application Data

(63) Continuation of application No. PCT/EP2004/005824, filed on May 28, 2004.

(30) Foreign Application Priority Data

Jun. 24, 2003 (DE) ................................ 103 28 335

(51) Int. Cl.
*H04R 5/02* (2006.01)
*H04B 3/20* (2006.01)
*H02B 1/00* (2006.01)
*G06F 17/00* (2006.01)

(52) U.S. Cl. ......................... 381/310; 381/66; 381/123; 700/94

(58) Field of Classification Search ............. 381/17–19, 381/59, 66, 89, 123, 310; 700/94
See application file for complete search history.

(56) References Cited

U.S. PATENT DOCUMENTS 5,142,586 A * 8/1992 Berkhout ..................... 381/63
5,715,318 A 2/1998 Hill et al. ....................... 381/24
2003/0002693 A1 * 1/2003 Aylward et al. ............... 381/17

FOREIGN PATENT DOCUMENTS

EP 0 735 796 A2 10/1996
EP 1 206 160 A1 5/2002

OTHER PUBLICATIONS

Verheijen, Edwin Nico Gerard, Sound Production by Wave Field Synthesis, Jan. 1998, pp. 45-47, 83-85, 104-112.*

(Continued)

*Primary Examiner*—Curtis Kuntz
*Assistant Examiner*—Jesse A Elbin
(74) *Attorney, Agent, or Firm*—Thomas, Kayden, Horstemeyer & Risley. LLP.

(57) ABSTRACT

In a wave field synthesis apparatus for driving an array of loudspeakers with drive signals, the loudspeakers being arranged at different defined positions, a drive signal for a loudspeaker being based on an audio signal associated with a virtual source having a virtual position with reference to the loudspeaker array and on the defined position of the loudspeaker, at first relevant loudspeakers of the loudspeaker array are determined on the basis of the position of the virtual source, a predefined listener position, and the defined positions of the loudspeakers, so that artifacts due to loudspeaker signals moving opposite to a direction from the virtual source to the predefined listener position are reduced. Downstream to means for calculating the drive signal components for the relevant loudspeakers and for a virtual source, there is means for providing the drive signal components for the relevant loudspeakers for the virtual source to the relevant loudspeakers, wherein no drive signals for the virtual source are provided to loudspeakers of the loudspeaker array not belonging to the relevant loudspeakers. With this, artifacts in an area of the audience room due to a generation wave field are suppressed, so that in this area only the useful wave field is heard in artifact-free manner.

9 Claims, 7 Drawing Sheets

OTHER PUBLICATIONS

Japanese Office Action mailed Apr. 1, 2008. for application JP 2006-515803.

Abstract from Japanese Patent Application, Publication No. 04-29040 (English Translation)., Oct. 14, 1992.

Abstract from Japanese Patent Application, Publication No. 07-222299 (English Translation)., Aug. 18, 1995.

Abstract from Japanese Patent Application, Publication No. 57-009200 (English Translation)., Jan. 18, 1982.

de Vries et al., "Wave Field Synthesis and Analysis Using Array Technology," Proc. 1999 IEEE Workshop on Applications of Signal Processing to Audio and Acoustics, New Paltz, NY, Oct. 17-20, 1999, pp. 15-18.

Thiele et al., "Wellenfeldsynthese Neue Möglichkeiten der räumlichen Tonaufnahme und-wiedergabe," Fernseh- Und Kino-Technik, 57, Jahrgang, No. May 2003, pp. 222-226.

Berkout et al., "Acoustic control by wave field synthesis," J. Acoust. Soc. Am., vol. 93, No. 5, May 1993, pp. 2764-2778.

de Bruijn et al. "Subjective experiments on the effects of combining spatialized audio and 2D video projection in audio-visual systems," Audio Engineering Society Convention Paper 5582, Presented at the $112^{th}$ Convention, May 10-13, 2002, pp. 1-11.

Reiter et al., "Automatisierte Anpassung der Akustik an virtuelle Räume," $46^{th}$ International Scientific Colloquium, Ilmenau Technical University, Sep. 24-27, 2001, pp. 1-4.

Verheijen, Edwin Nico Gerard, *Sound Production by Wave Field Synthesis*, Jan. 1998, pp. 48-49.

English Translation of Preliminary Examination Report for PCT/EP2004/005824 dated May 11, 2006.

* cited by examiner

WAVE FIELD SYNTHESIS APPARATUS AND METHOD OF DRIVING AN ARRAY OF LOUDSPEAKERS

CROSS-REFERENCE TO RELATED APPLICATION

This application is a continuation of co-pending International Application No. PCT/EP2004/005824, filed May 28, 2004, which designated the United States and was not published in English and is incorporated herein by reference in its entirety.

BACKGROUND OF THE INVENTION

1.. Field of the Invention

The present invention relates to wave field synthesis systems and, in particular, to the avoidance of artifacts due to loudspeaker arrays with a limited number of loudspeakers.

2. Description of the Related Art

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel loudspeaker reproduction of audio signals have been known and standardized for many years. All usual techniques have the disadvantage that both the site of the loudspeakers and the position of the listener are already impressed on the transfer format. With wrong arrangement of the loudspeakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave field synthesis (WFS), have been studied at the TU Delft and first presented in the late 80s (Berkout, A. J.; de Vries, D.; Vogel, P.: Acoustic control by Wave field Synthesis. JASA 93, 993).

Due to this method's enormous demands on computer power and transfer rates, the wave field synthesis has up to now only rarely been employed in practice. Only the progress in the area of the microprocessor technology and the audio encoding do permit the employment of this technology in concrete applications today. First products in the professional area are expected next year. In a few years, first wave field synthesis applications for the consumer area are also supposed to come on the market.

The basic idea of WFS is based on the application of Huygens' principle of the wave theory:

Each point caught by a wave is starting point of an elementary wave propagating in spherical or circular manner.

Applied on acoustics, every arbitrary shape of an incoming wave front may be replicated by a large amount of loudspeakers arranged next to each other (a so-called loudspeaker array). In the simplest case, a single point source to be reproduced and a linear arrangement of the loudspeakers, the audio signals of each loudspeaker have to be fed with a time delay and amplitude scaling so that the radiating sound fields of the individual loudspeakers overlay correctly. With several sound sources, for each source the contribution to each loudspeaker is calculated separately and the resulting signals are added. If the sources to be reproduced are in a room with reflecting walls, reflections also have to be reproduced via the loudspeaker array as additional sources. Thus, the expenditure in the calculation strongly depends on the number of sound sources, the reflection properties of the recording room, and the number of loudspeakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real loudspeaker array and the listener.

Although the wave field synthesis functions well for environments the properties of which are known, irregularities occur if the property changes or the wave field synthesis is executed on the basis of an environment property not matching the actual property of the environment.

The technique of the wave field synthesis, however, may also be advantageously employed to supplement a visual perception by a corresponding spatial audio perception. Previously, in the production in virtual studios, the conveyance of an authentic visual impression of the virtual scene was in the foreground. The acoustic impression matching the image is usually impressed on the audio signal by manual steps in the so-called postproduction afterwards or classified as too expensive and time-intensive in the realization and thus neglected. Thereby, usually a contradiction of the individual sensations arises, which leads to the designed space, i.e. the designed scene, to be perceived as less authentic.

In the technical publication "Subjective experiments on the effects of combining spatialized audio and 2D video projection in audio-visual systems", W. de Bruijn and M. Boone, AES convention paper 5582, May 10 to 13, 2002, Munich, subjective experiments with reference to effects of combining spatial audio and a two-dimensional video projection in audiovisual systems are illustrated. In particular, it is stressed that two speakers standing at differing distance to a camera and almost standing behind each other can be better understood by a viewer if the two people standing behind each other are seen and reconstructed as different virtual sound sources with the aid of the wave field synthesis. In this case, by subjective tests, it has turned out that a listener can better understand and distinguish the two speakers, who are talking at the same time, separately from each other.

In a conference contribution to the $46^{th}$ international scientific colloquium in Ilmenau from Sep. 24 to 27, 2001, entitled "Automatisierte Anpassung der Akustik an virtuelle Räume", U. Reiter, F. Melchior, and C. Seidel, an approach to automate tone postproduction processes is presented. To this end, the parameters of a film set necessary for the visualization, such as room size, texture of the surfaces or camera position, and position of the actors, are checked for their acoustic relevance, whereupon corresponding control data is generated. This then influences, in automated manner, the effect and postproduction processes employed for postproduction, such as the adaptation of the speaker volume dependence on the distance to the camera, or the reverberation time in dependence on room size and wall texture. Here, the aim is to increase the visual impression of a virtual scene for heightened perception of reality.

"Hearing with the ears of the camera" is to be enabled, in order to make a scene appear more real. Here, an as high as possible correlation between sound event location in the picture and hearing event location in the surround field is strived for. This means that sound source positions are supposed to be always adapted to the picture. Camera parameters, such as zoom, are also to be included into the tone design, just as a position of two loudspeakers L and R. To this end, tracking data of a virtual studio are written into a file together with an accompanying time code by the system. At the same time, picture, tone, and time code are recorded on a MAZ. The camdump file is transferred to a computer generating control data for an audio workstation therefrom and outputting it synchronously to the picture originating from the MAZ via a MIDI interface. The actual audio processing, such as positioning of the sound source in the surround field and inserting early reflections and reverberation, takes place within the audio workstation. The signal is rendered for a 5.1 surround loudspeaker system.

Camera tracking parameters, just like positions of sound sources in the capture setting, may be recorded in real movie sets. Such data may also be generated in virtual studios.

In a virtual studio, an actor or presenter stands alone in a recording room. In particular, he or she stands in front of a blue wall, also referred to as blue box or blue panel. Onto this blue wall, a pattern of blue and light-blue strips is applied. The special thing about this pattern is that the strips are of different width, and thus a multiplicity of strip combinations result. Due to the unique strip combinations on the blue wail, in postproduction, when the blue wall is replaced by a virtual background, it is possible to exactly determine in which direction the camera is looking. With the aid of this information, the computer may determine the background for the current camera viewing angle. Furthermore, sensors from the camera sensing and outputting additional camera parameters are evaluated. Typical parameters of a camera sensed by means of sensors are the three degrees of translation x, y, z, the three degrees of rotation, also referred to as roll, tilt, pan, and the focal length or zoom, which is of equal meaning with the information on the aperture angle of the camera.

So that the exact position of the camera may also be determined without image recognition and without expensive sensor technology, also a tracking system may be employed, which consists of several infrared cameras determining the position of an infrared sensor mounted to the camera. Thus, also the position of the camera is determined. With the camera parameters provided by the sensor technology and the strip information evaluated by the image recognition, a real-time computer may now compute the background for the current picture. Hereupon, the blue hue, which the blue background had, is removed from the picture, so that the virtual background is played in instead of the blue background.

In the majority of cases, a concept is followed, in which it is all about getting an acoustic overall impression of the visually imaged scenery. This may be well described with the term of the "full shot" originating from image design. This "full shot" sound impression mostly remains constant over all shots in a scene, although the optical angle of view on the things mostly changes strongly. Thus, optical details are highlighted by corresponding shots or put to the background. Counter shots in the movie dialog design are also not reenacted by the tone.

Hence, there is the need to acoustically embed the viewer into an audiovisual scene. Here, the screen or image area forms the viewing direction and the angle of view of the viewer. This means that the tone is to track the image in the form that it always matches the scene image. In particular, this becomes even more important for virtual studios, since there is typically no correlation between the tone of, for example, the presentation and the surrounding in which the presenter currently is. In order to get an audiovisual overall impression of the scene, a spatial impression matching the image rendered has to be simulated. A substantial subjective property in such a sound concept in this connection is the location of a sound source, as a viewer of a movie screen perceives it, for example.

In the audio field, by the technique of the wave field synthesis (WFS), good spatial sound for a large listener area can be accomplished. As it has been set forth, the wave field synthesis is based on the Huygens principle, according to which wave fronts may be shaped and built up by superimposition of elementary waves. According to a mathematically exact, theoretical description, an infinite number of sources in infinitely small distance would have to be used for the generation of the elementary waves. In practice, however, a finite number of loudspeakers is used in a finite, small distance to each other. Each of these loudspeakers is controlled with an audio signal from a virtual source having a certain delay and a certain level, according to the WFS principle. Levels and delays are usually different for all loudspeakers.

At is has already been set forth, the wave field synthesis system works on the basis of the Huygens principle and reconstructs a given waveform, for example, of a virtual source arranged at a certain distance to a presentation area or a listener in the presentation area by a multiplicity of individual waves. The wave field synthesis algorithm thus obtains information on the actual position of an individual loudspeaker from the loudspeaker array to then calculate, for this individual loudspeaker, a component signal this loudspeaker then finally has to irradiate, so that a superimposition of the loudspeaker signal from the one loudspeaker with the loudspeaker signals of the other active loudspeakers performs a reconstruction in that the listener has the impression that he or she is not "irradiated with sound" by many individual loudspeakers, but only by a single loudspeaker at the position of the virtual source.

For several virtual sources in a wave field synthesis setting, the contribution of each virtual source for each loudspeaker, i.e. the component signal of the first virtual source for the first loudspeaker, of the second virtual source for the first loudspeaker, etc., is calculated to then add the component signals to finally obtain the actual loudspeaker signal. In case of, for example, three virtual sources, the superimposition of the loudspeaker signals of all active loudspeakers at the listener would lead to the listener not having the impression that he or she is irradiated with sound from a large array of loudspeakers, but that the sound he or she is hearing only comes from three sound sources positioned at special positions, which are equal to the virtual sources.

In practice, the calculation of the component signals mostly takes place by the audio signal associated with a virtual source being imparted with a delay and a scaling factor at a certain time instant, depending on position of the virtual source and position of the loudspeaker, in order to obtain a delayed and/or scaled audio signal of the virtual source, which immediately represents the loudspeaker signal, when only one virtual source is present, or which then contributes to the loudspeaker signal for the loudspeaker considered, after addition with further component signals for the loudspeaker considered from other virtual sources.

Typical wave field synthesis algorithms work independently of how many loudspeakers are present in the loudspeaker array. The theory underlying the wave field synthesis consists in the fact that each arbitrary sound field may be exactly reconstructed by an infinitely high number of individual loudspeakers, the individual loudspeakers being arranged infinitely close to each other. In practice, however, neither the infinitely high number nor the infinitely close arrangement can be realized. Instead, there are a limited number of loudspeakers, which are additionally arranged in certain given distances to each other. With this, in real systems, always only an approximation is achieved to the actual waveform that would take place if the virtual source was actually present, i.e. was a real source.

Furthermore, there are various scenarios in that the loudspeaker array, when considering a movie theater, is only arranged, for example, on the side of the movie screen. In this case, the wave field synthesis module would generate loudspeaker signals for these loudspeakers, wherein the loudspeaker signals for these loudspeakers will normally be the same as for corresponding loudspeakers in a loudspeaker array not only extending across the side of a movie theater, for example, on which the screen is arranged, but which is also arranged to the left, to the right, and behind the audience room. This "360°" loudspeaker array will of course provide a better approximation to an exact wave field than only a one-sided array, for example in front of the viewers. Nevertheless, the loudspeaker signals for the loudspeakers that are in front of the viewers are the same in both cases. This means that a wave field synthesis module typically does not obtain feedback as to how many loudspeakers are present or whether it is a one-sided or multi-sided or even a 360° array or not. In other words, a wave field synthesis means calculates a loudspeaker signal for a loudspeaker due to the position of the loudspeaker and independent of the fact which further loudspeakers are also present or not present.

Subsequently, on the basis of FIG. 9, it is gone into an artifact problem resulting when a virtual source 900 is in a listening room 902 defined by a loudspeaker array 904 arranged around the room, which comprises array groups 904*a*, 904*b*, 904*c*, and 904*d* in the embodiment shown in FIG. 9.

By computing means not shown in FIG. 9, drive signals are generated for the loudspeakers belonging to the loudspeaker subarrays 904*a*, 904*b*, 904*c*, 904*d*. For the reconstruction of the virtual source 900, which is assumed as a source irradiating in spot-shaped manner in the picture shown in FIG. 9, the drive signals for the individual loudspeakers 904 are supplied so that the sound signals or wave fronts given off from the loudspeakers are focused onto the virtual position of the virtual source 900. Of course, each loudspeaker 904 at first gives off a sound signal in its main radiation direction, i.e. typically perpendicular to the loudspeaker membrane. Due to the mutual superimpositions of the sound signals of the individual loudspeakers, caused by the drive signals based on the laws of the wave field synthesis, however, focusing of the wave fronts onto the virtual position of the virtual source 900 takes places, as it is illustrated by the dashed lines (e.g. 910) originating from the individual loudspeakers. The loudspeaker from which the dashed line 910 originates generates, just like all other loudspeakers, a loudspeaker signal moving to the virtual source in such a manner that a solid line pertinent to the dashed line 910, which is closed with an arrowhead and designated with 912 in FIG. 9, in a way represents the useful signal of the virtual source.

Correspondingly, the wave front moving toward the virtual source 900 is represented by a further dashed line 914 leading to a useful signal 916 of the virtual source 900, as it is illustrated by the solid line 916 closed with an arrow. This means that in principle two wave fields overlay each other in the audience room. In the embodiment shown in FIG. 9, the one wave field is all dashed lines supposed to illustrate the focusing of the loudspeaker signals onto the position of the virtual source 900. On the other hand, there is the "useful" wave field illustrated by the solid lines (e.g. 912 and 916) closed with an arrow in FIG. 9. Due to the superimposition of these two wave fields, i.e. the "generation wave field" on the one hand and the "useful wave field" on the other hand, artifacts develop in the entire audience room 902. These artifacts are system-induced, since the virtual source 900 is positioned within the array, and since no loudspeaker having a spot beam characteristic is provided at the position of the virtual source.

In other words, for the generation of the useful signal, a signal of the loudspeaker subarray 904*a* and a loudspeaker signal from at least the lower parts of the loudspeaker arrays 904*b* and 904*d* would be generated on the side of the virtual source 900 on which the solid line 916 is drawn in FIG. 9. On the other hand, in order to generate, however, a signal of the virtual source 900 as useful signal on the side of the virtual source on which the solid line 912 is drawn, a wave front from the loudspeaker subarray 904*c* as well as from at least parts of the loudspeaker arrays 904*d* and 904*b*, which will typically be above the virtual source, would be generated. With this, as it has been set forth, artifacts develop in the entire audience room 902, since the listener will hear both the generation wave field outlined with the dashed lines in FIG. 9 and the useful wave field characterized by the solid lines in FIG. 9.

Actually, the listener would, however, only like to hear the useful wave field, i.e. the wave field represented by the solid lines closed with an arrow, whereas of course having no interest in the generation wave field represented by the dashed lines in FIG. 9. But since the listener, as it has been set forth, hears both wave fields, undesired artifacts result.

SUMMARY OF THE INVENTION

It is an object of the present invention to provide a wave field synthesis concept with at least reduced artifacts.

In accordance with a first aspect, the present invention provides a wave field synthesis apparatus for driving an array of loudspeakers with drive signals, the loudspeakers being arranged at different defined positions, a drive signal for a loudspeaker being based on an audio signal associated with a virtual source having a virtual position with reference to the loudspeaker array and the defined position of the loudspeaker, having: a determinator for determining relevant loudspeakers of the loudspeaker array on the basis of the position of the virtual source, a predefined listener position, and the defined positions of the loudspeakers, such that artifacts due to loudspeaker signals moving opposite to a direction from the virtual source to the predefined listener position are reduced; a calculator for calculating the drive signal components for the relevant loudspeakers and the virtual source; and a provider for providing the drive signal components for the relevant loudspeakers for the virtual source to the relevant loudspeakers, wherein no drive signals for the virtual source are provided to loudspeakers of the loudspeaker array not belonging to the relevant loudspeakers.

In accordance with a second aspect, the present invention provides a method of driving an array of loudspeakers with drive signals, the loudspeakers being arranged at different defined positions, a drive signal for a loudspeaker being based on an audio signal associated with a virtual source having a virtual position with reference to the loudspeaker array and on the defined position of the loudspeaker, with the steps of: determining relevant loudspeakers of the loudspeaker array on the basis of the position of the virtual source, a predefined listener position, and the defined positions of the loudspeakers, such that artifacts due to loudspeaker signals moving opposite to a direction from the virtual source to the predefined listener position are reduced; calculating the drive signal components for the relevant loudspeakers and the virtual source; and providing the drive signal components for the relevant loudspeakers for the virtual source to the relevant loudspeakers, wherein no drive signals for the virtual source are provided to loudspeakers of the loudspeaker array not belonging to the relevant loudspeakers.

In accordance with a third aspect, the present invention provides a computer program with program code for performing, when the program is executed on a computer, the method of driving an array of loudspeakers with drive signals, the loudspeakers being arranged at different defined positions, a drive signal for a loudspeaker being based on an audio signal associated with a virtual source having a virtual position with reference to the loudspeaker array and on the defined position of the loudspeaker, with the steps of: determining relevant loudspeakers of the loudspeaker array on the basis of the position of the virtual source, a predefined listener position, and the defined positions of the loudspeakers, such that artifacts due to loudspeaker signals moving opposite to a direction from the virtual source to the predefined listener position are reduced; calculating the drive signal components for the relevant loudspeakers and the virtual source; and providing the drive signal components for the relevant loudspeakers for the virtual source to the relevant loudspeakers, wherein no drive signals for the virtual source are provided to loudspeakers of the loudspeaker array not belonging to the relevant loudspeakers.

The present invention is based on the finding that a reduction or elimination of artifacts due to the "generation wave field", as it has been explained with reference to FIG. 9, is achieved by only performing a partial reconstruction of the wave field of a virtual source by not all loudspeakers of the loudspeaker array being supplied with drive signal components, but by at first determining relevant loudspeakers of the loudspeaker array on the basis of the position of the virtual source, whereafter drive signal components for the loudspeakers determined as relevant are calculated on the basis of the audio signal for the virtual source, and wherein then only the relevant loudspeakers are served with drive signal components calculated therefor, whereas the non-relevant loudspeakers are not served with drive signal components due to the audio signal associated with the virtual source.

With this, only part of the useful wave field of a virtual source is reconstructed, wherein this partial wave field to be reconstructed can be determined arbitrarily. In particular, according to the invention, depending on a certain listener position, a sound emission of the loudspeakers arranged with reference to the listener position and the virtual source such that the listener position is between the virtual source and the loudspeakers is suppressed.

The loudspeakers for which this is the case are non-relevant loudspeakers and are thus also not controlled to suppress the generation wave field in the partial room in which the listener position is, so that the listener only perceives the useful wave field of the virtual source at the listener position thereof and will thus have artifact-free hearing enjoyment.

However, this leads to the fact that on the opposite side of the virtual source, i.e. on the side of the virtual source, where the relevant loudspeakers are, only the generation wave field is present, but that the useful wave field is deactivated there. Hence, a listener will have clearly reduced hearing enjoyment on this side, since here only the generation wave field exists, but not the useful wave field with reference to a virtual source.

However, since typically several virtual sources will be present at several positions, and since it will often be the case that the virtual position is not in the middle of the audience room, but at a periphery, the reduction of the listening impression on the "bad" side of the audience room, i.e. in the area of the audience room on the opposite side of the defined listener position used for relevance determination with reference to the virtual source, is not so serious, so that this loss in quality is acceptable regarding the overall gain with reference to the entire audience room or the majority of listeners.

In other words, means for determining the relevant loudspeakers of the loudspeaker array on the basis of the position of the virtual source and the defined positions of the loudspeakers is operative to reduce artifacts due to loudspeaker signals of the "generation wave field", which move opposite to a direction from the virtual source to the defined listener position.

In a preferred embodiment of the present invention, for sources outside the audience room, all loudspeakers are determined as non-relevant for a virtual source, in which an angle between their main radiation direction and the direction from the virtual source through this loudspeaker is greater than 90 degrees. This means that a vector from the virtual source to the loudspeaker does not have a direction component parallel to a main radiation direction of a loudspeaker. If this is the case, the loudspeaker is determined as non-relevant, since this loudspeaker will then not be capable of contributing to the reconstruction of a wave field supposed to extend from the virtual source to the listener position, and not vice versa.

At this point, it should be pointed out that a somehow semicircular radiation field of the loudspeaker, in which its main radiation direction is, i.e. which is in front of the loudspeaker, is considered for the above considerations. Potential additional irradiations to the rear are not taken into account. If such an additional irradiation "to the rear" has a direction component, this will be ignored and is thus not important in the determination of the loudspeakers.

In a preferred embodiment of the present invention, in which a line array is used as loudspeaker array, with which a so-called receiver line in the audience room may be generated, which may in principle take on arbitrary forms, as it is set forth in the doctoral thesis entitled "Sound Reproduction by Wave Field Synthesis", Edwin N. G. Verheijen, 1998, the audience room is divided in two half rooms on the basis of the receiver line, for which the wave field reconstruction is optimal. A line parallel to the receiver line and passing through the virtual position divides the audience room into a first and into a second half room. In the half room in which the listener position is, all loudspeakers are determined as non-relevant in order to deactivate the generation wave field due to the virtual source in this half room, in which a good audio impression is supposed to be. In the other half room, however, all loudspeakers are determined as relevant in order to generate the useful wave field of the virtual source necessary for a good audio impression in the half room in which the listener position is.

The above considerations refer to a virtual source with a virtual position in the audience room. But if a virtual source is at a virtual position outside the audience room, it is preferred to determine all loudspeakers lying beyond the receiver line as non-relevant loudspeakers. At the same time, in a preferred embodiment of the present invention, loudspeakers in which the angle between the loudspeaker axis, i.e. the main radiation direction, and a line through the virtual source on the one hand and the loudspeaker considered on the other hand is not greater than 90 degrees are determined as non-relevant, in order to again eliminate the generation wave field for components of the virtual source outside the room, which face away from the audience room, such that only the useful wave field of the virtual source is present in the audience room. In other words, again the loudspeakers emitting the loudspeaker signals having a direction oppositely directed with reference to the direction from the virtual source to the listener position are deactivated.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
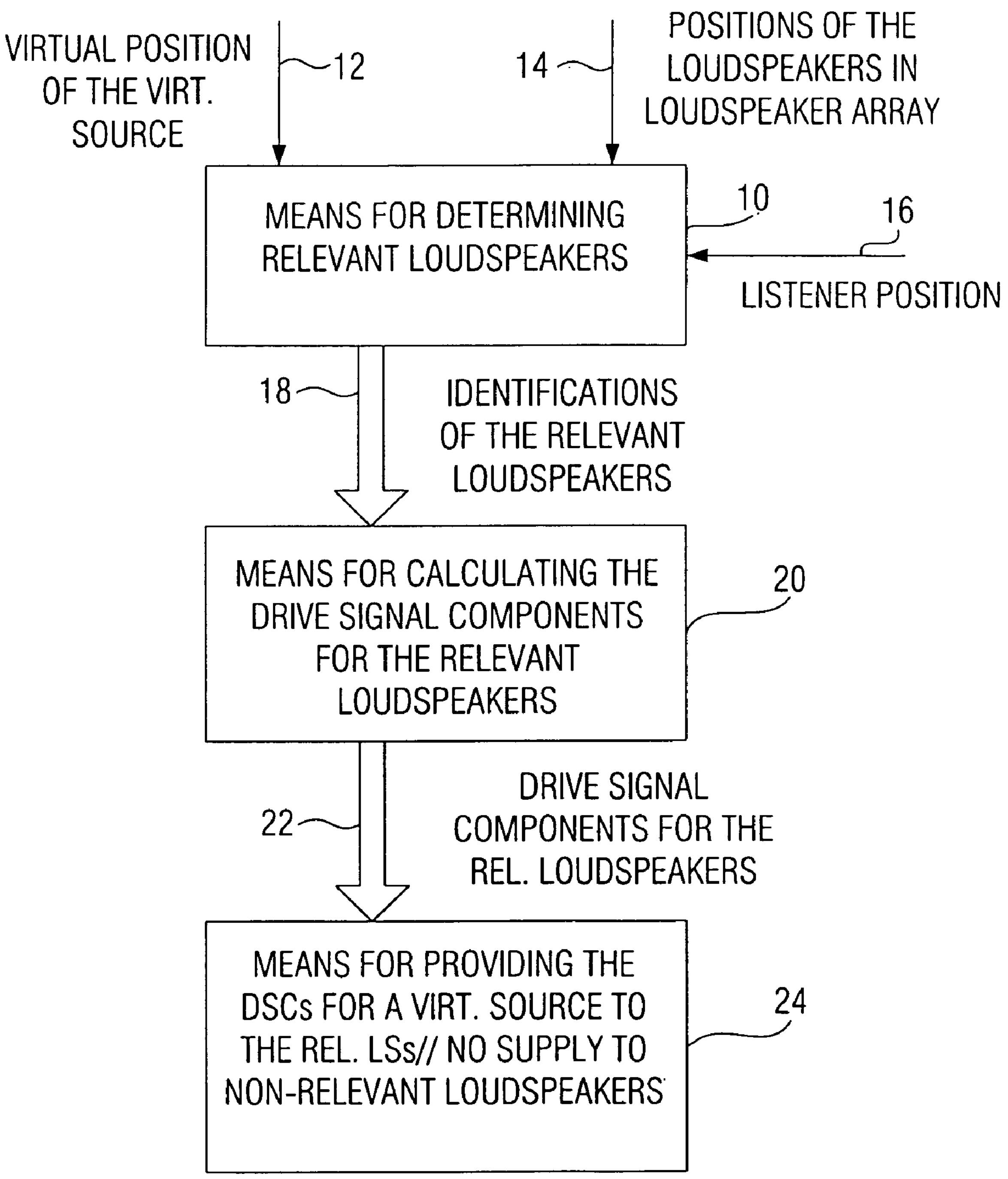
FIG. 1 is a block circuit diagram of a wave field synthesis apparatus according to the invention.

FIG. 1 shows a block circuit diagram of an inventive wave field synthesis apparatus. The wave field synthesis apparatus serves for driving an array of loudspeakers with drive signals. The loudspeakers are, as it will be explained on the basis of FIG. 8, disposed at different defined positions of an audience room, as it is known from the field of wave field synthesis. A drive signal for a loudspeaker is based on an audio signal associated with a virtual source having a virtual position with reference to the loudspeaker array on the one hand and on the defined position of the loudspeaker for which the drive signal is intended on the other hand.

At this point, it is to be pointed out that in a wave field synthesis setting there will typically be several virtual sources arranged at various virtual positions. The wave field synthesis apparatus is formed to calculate a drive signal component for a loudspeaker for each virtual source in this case, wherein then the drive signal components for a loudspeaker considered, which have been calculated due to the various virtual sources, are summed up in order to finally obtain the drive signal for the loudspeaker, into which thus several virtual sources or the audio signals associated with several virtual sources enter.

The wave field synthesis apparatus according to the invention shown in FIG. 1 includes means 10 for determining relevant loudspeakers of the loudspeaker array. Means 10 is formed to perform the determination on the basis of a virtual position of the virtual source, which is fed via a first input 12. Furthermore, means 10 for determining works on the basis of the position of the currently considered loudspeaker, which is fed to the means via a further input 14 in the principle block circuit diagram shown in FIG. 1. It is to be pointed out that the positions of the loudspeakers in the loudspeaker array are typically fixedly given and will for example be stored within means 10 in form of a table, i.e. do not necessarily have to be fed via an input 14 of their own. Finally, means 10 for determining relevant loudspeakers works on the basis of a listener position considered, which may be fed via a further input 16. At this point it should also be pointed out that the listener position, or a half room of listener positions to be served in artifact free manner, in a preferred embodiment, will not change every time, but may also be fixedly adjusted. Depending on the embodiment, the listener position or the several listener positions, which are where the generation wave field is deactivated, may thus constantly change or be fixedly given.

As will be explained later on, it is preferred to determine, on the basis of the receiver line, which is again also preferably laid through the center of the audience room, the defined listener position for each virtual source on the one hand and each position of each virtual source on the other hand, such that the listener position input 16 is used to determine the relevant loudspeakers of the loudspeaker array.

Means 10 is formed to reduce or to eliminate artifacts due to loudspeakers outputting loudspeaker signals moving opposite to a direction from the virtual source to the listener position. At this point, it should be pointed out that in an embodiment of the present invention not only the loudspeakers emitting opposite to the direction from the virtual source to the listener position are deactivated, but also that loudspeakers the emission direction of which has a component opposite to the direction from the virtual source to the listener position or only having one component perpendicular to the direction from the virtual source to the listener position are determined as non-relevant.

Means 10 is formed to identify the relevant loudspeakers and to communicate this information via an output 18 of means 20 for calculating the drive signal component for the relevant loudspeakers. Means 20 is formed as usual wave field synthesis module in that it calculates drive signal components for loudspeakers on the basis of the wave field synthesis technique, wherein the drive signal components for the loudspeakers will differ from each other in delay and scaling, i.e. attenuation/amplification, but wherein, apart from the delay on the one hand and the scaling on the other hand, the result of samples in a drive signal component will be the same as it is given for a virtual source, i.e. will be equal to the audio signal associated with the virtual source.

Figure 9:
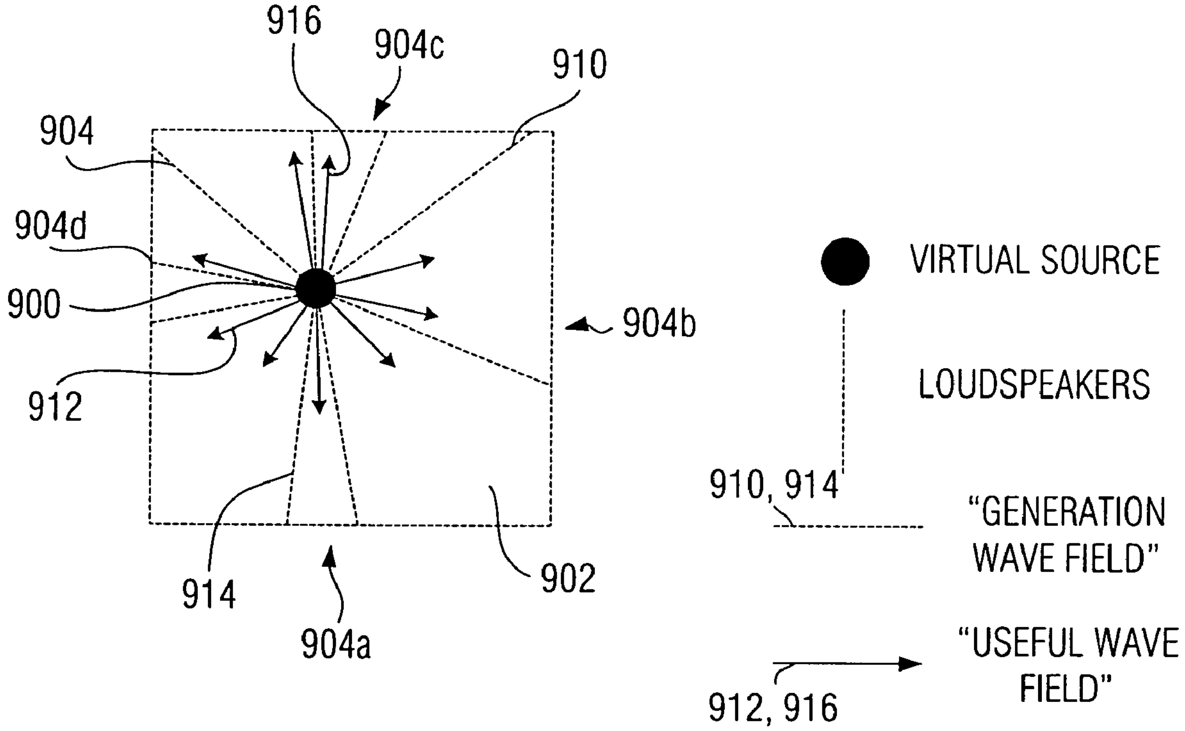
FIG. 9 is a principle illustration for the explanation of the reconstruction of a wave field of a virtual source irradiating in spot-shaped manner.

Means 20 for calculating is formed to output the drive signal components for the relevant loudspeakers at an output 22 and feed them to means 24. Means 24 serves for supplying the drive signal components for a virtual source to the relevant loudspeakers, whereas no drive signal components for the virtual source are communicated to non-relevant loudspeakers, in order to thereby suppress the “generation wave field”, which has been explained on the basis of FIG. 9, in an area of the audience room in which the defined listener position is.

Subsequently, referring to FIGS. 2 and 3, it is gone into the general functionality of the wave field synthesis module in general or into the calculating of the drive signals for the loudspeakers, i.e. the calculation of the loudspeaker signals on the basis of the drive signal components or component signals is explained. At first, however, a usual wave field synthesis overall environment is illustrated on the basis of FIG. 8.

Figure 8:
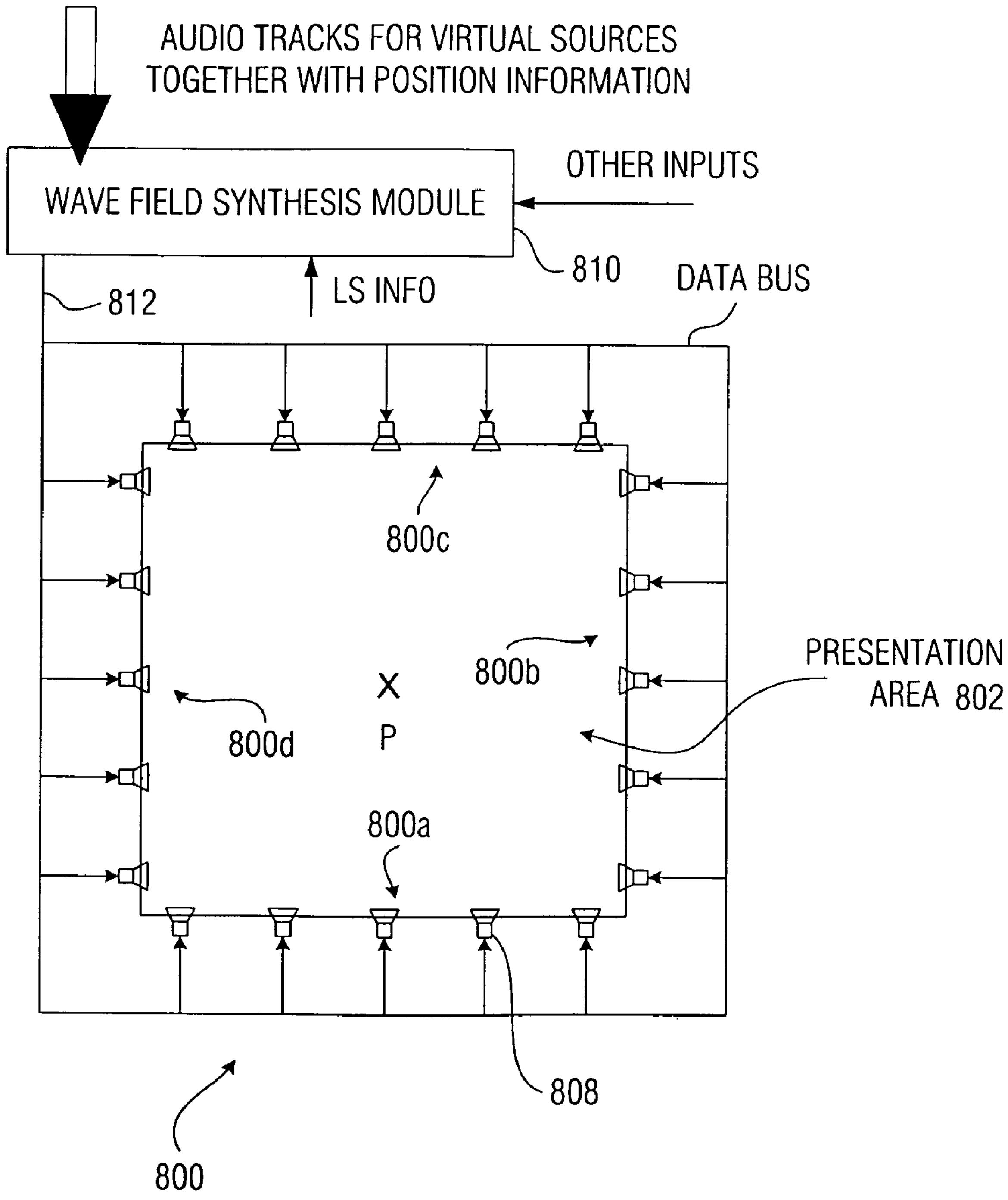
FIG. 8 is a principle block circuit diagram of a wave field synthesis system with wave field synthesis module and loudspeaker array in a presentation area.

Before going into the present invention in greater detail, the principle construction of a wave field synthesis system will subsequently be illustrated on the basis of FIG. 8. The wave field synthesis system has a loudspeaker array 800, which is placed with reference to a presentation area 802. In particular, the loudspeaker array shown in FIG. 8, which is a 360° array, includes four array sides 800*a*, 800*b*, 800*c*, and 800*d*.. If the presentation area 802 is e.g. a movie theater, it is assumed, with reference to the conventions front/back or right/left, that the movie screen is on the same side of the representation area 802 on which also the partial array 800*c* is arranged. In this case, the viewer sitting at the so-called optimum point P in the presentation area 802 would look to the front, i.e. to the screen. Behind the viewer, there would then be the partial array 800*a*, whereas the partial array 800*d* would be to the left of the viewer, and whereas the partial array 800*b* would be to the right of the viewer. Each loudspeaker array consists of a number of various individual loudspeakers 808, each controlled with loudspeaker signals of their own provided from a wave field synthesis module 810 via a data bus 812 only schematically shown in FIG. 8. The wave field synthesis module is formed to calculate, using the information on e.g. type and location of the loudspeakers with reference to the presentation area 802, i.e. of loudspeaker information (LS info), and with other inputs, if necessary, loudspeaker signals for the individual loudspeakers 808, which are each derived from the audio tracks for virtual sources, with which position information is also associated, according to the known wave field synthesis algorithms. The wave field synthesis module may further also obtain further inputs, such as information on the room acoustics of the presentation area, etc.

The subsequent statements on the present invention may in principle be performed for every point P in the presentation area. The optimum point may thus be at any arbitrary place in the presentation area 802. There may also be several optimum points, e.g. on an optimum line. In order to obtain as-good-as-possible conditions for as many points in the presentation area 802 as possible, however, it is preferred to assume the optimum point or the optimum line in the middle or at the center of gravity of the wave field synthesis system defined by the loudspeaker partial arrays 800*a*, 800*b*, 800*c*, 800*d*.

A more detailed illustration of the wave field synthesis module 800 will subsequently be given on the basis of FIGS. 2 and 3 with reference to the wave field synthesis module 200 in FIG. 2 or the arrangements illustrated in detail in FIG. 3.

Figure 2:
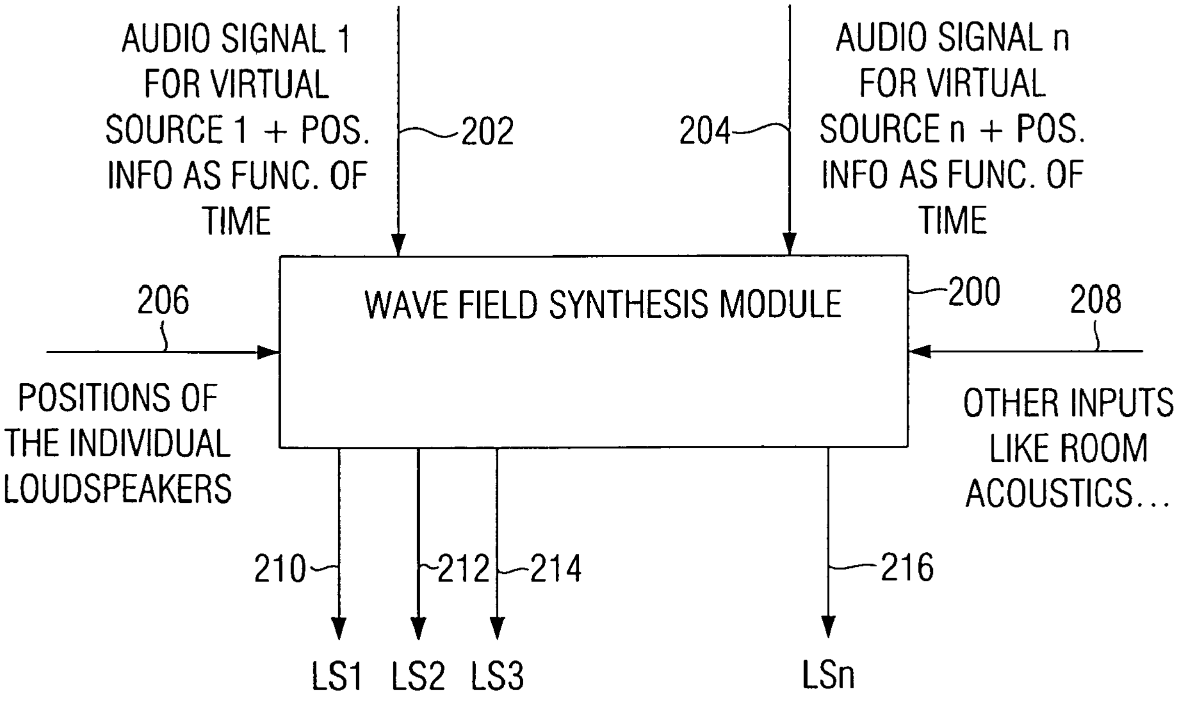
FIG. 2 is a principle circuit diagram of a wave field synthesis environment.

FIG. 2 shows a wave field synthesis environment in which the present invention may be implemented. The center of a wave field synthesis environment is a wave field synthesis module 200 including various inputs 202, 204, 206, and 208 as well as various outputs 210, 212, 214, 216. Via inputs 202 to 204, various output signals for virtual sources are fed to the wave field synthesis module. In this way, the input 202 receives e.g. an audio signal of the virtual source 1 as well as associated position information of the virtual source. In a movie theater setting, for example, the audio signal 1 would for example be the voice of an actor moving from a left side of the screen to a right side of the screen and possibly additionally away from the viewer or toward the viewer. The audio signal 1 would then be the actual voice of this actor, whereas the position information illustrates the position of the first actor in the capture setting, current at a certain time instant, as a function of time. On the other hand, the audio signal n would be the voice of, for example, another actor moving in the same way or differently than the first actor. The current position of the other actor, with which the audio signal n is associated, is reported to the wave field synthesis module 200 by position information synchronized with the audio signal n. In practice, various virtual sources exist depending on capture setting, wherein the audio signal of each virtual source is fed to the wave field synthesis module 200 as an audio track of its own.

As it has been set forth above, a wave field synthesis module feeds a multiplicity of loudspeakers LS1, LS2, LS3, LSm by output of loudspeaker signals via the outputs 210 to 216 to the individual loudspeakers. The positions of the individual loudspeakers in a reproduction setting, such as a movie theater, are reported to the wave field synthesis module 200 via the inputs 206. In the movie theater there are, grouped around the movie viewer, many individual loudspeakers arranged in arrays preferably such that there are loudspeakers both in front of the viewer, i.e. for example behind the screen, and behind the viewer as well as to the right and left of the viewer. Furthermore, other inputs may be reported to the wave field synthesis module 200, such as information on the room acoustics, etc., in order to be able to simulate the actual room acoustics present during the capture setting in a movie theater.

In general, the loudspeaker signal fed, for example, to the loudspeaker LS1 via the output 210 will be a superimposition of component signals of the virtual sources in that the loudspeaker signal for the loudspeaker LS1 includes a first component going back to the virtual source 1, a second component going back to the virtual source 2, as well as an n th component going back to the virtual source n. The individual component signals are superimposed linearly, i.e. added after their calculation, in order to replicate the linear superimposition at the ear of the listener, who will hear a linear superimposition of the sound sources perceptible by him or her in a real setting.

Subsequently, with reference to FIG. 3, a more detailed embodiment of the wave field synthesis module 200 will be illustrated. The wave field synthesis module 200 has a strongly parallel construction in that, starting from the audio signal for each virtual source and starting from the position information for the corresponding virtual source, at first delay information $V_i$ as well as scale factors $SF_i$ are calculated, which depend on the position information and the position of the loudspeaker just considered, e.g. the loudspeaker with the order number j, i.e. LSj. The calculation of delay information $V_i$ as well as a scaling factor $SF_i$ due to the position information of a virtual source and the location of the loudspeaker j considered takes place by known algorithms implemented in means 300, 302, 304, 306. On the basis of the delay information $V_i(t)$ and $SF_i(t)$, as well as on the basis of the audio signal $AS_i(t)$ associated with the individual virtual source, a discrete value $AW_i(t_A)$ for the component signal $K_{ij}$ in a finally obtained loudspeaker signal is calculated for a current time instant $t_A$. This takes place by means 310, 312, 314, 316, as they are schematically illustrated in FIG. 3. FIG. 3 further shows something of a "flash shot" at the time instant $t_A$ for the individual component signals. The individual component signals are then summed by a summer 320 to determine the discrete value for the current time instant $t_A$ of the loudspeaker signal for the loudspeaker j, which may then be fed to the loudspeaker for the output (for example, the output 214 if the loudspeaker j is the loudspeaker LS3).

Figure 3:
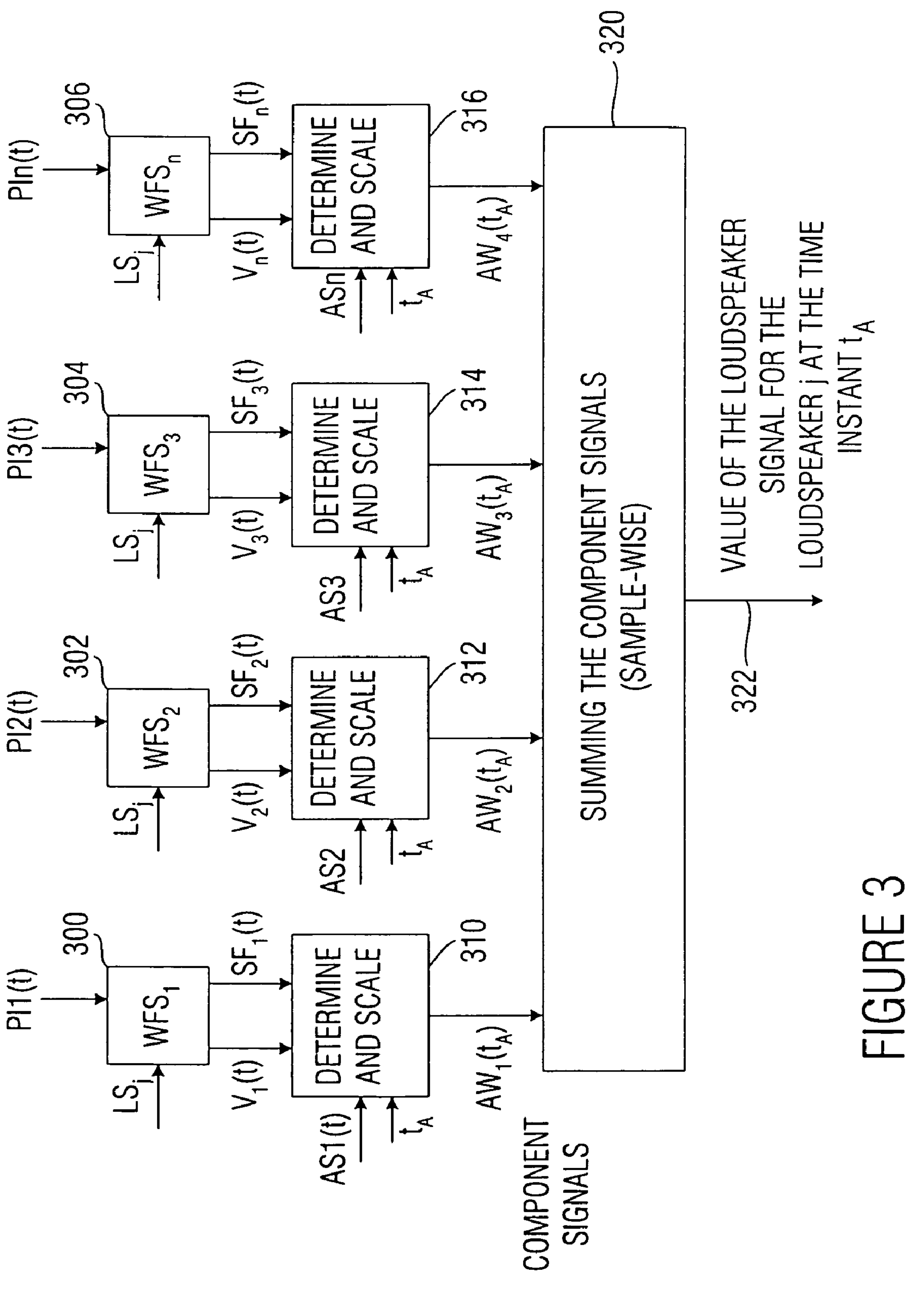
FIG. 3 is a more detailed illustration of the wave field synthesis environment shown in FIG. 2.

As can be seen from FIG. 3, for each virtual source, at first a value valid due to a delay and a scaling with a scaling factor at a current time instant is calculated individually, whereafter all component signals for a loudspeaker are summed due to the various virtual sources. If, for example, only one virtual source was present, the summer would be omitted, and the signal present at the output of the summer in FIG. 3 would correspond to e.g. the signal output from means 310 if the virtual source 1 is the only virtual source.

At this point, it should be pointed out that, at the output 322 of FIG. 3, the output of a loudspeaker signal is obtained, which is a superimposition of the component signals for this loudspeaker due to the various virtual sources 1, 2, 3, . . . , n. An arrangement, as it is shown in FIG. 3, would in principle be provided for each loudspeaker 808 in the wave field synthesis module 810, unless always 2, 4, or 8 adjacent loudspeakers are controlled with the same loudspeaker signal, which is preferred for practical reasons.

In a preferred embodiment of the present invention, it is distinguished whether the virtual source is within the audience room or whether the virtual source is outside the audience room. The situation of the virtual source outside the audience room is illustrated on the basis of FIG. 4, whereas the situation of the virtual source within the audience room will be explained on the basis of FIG. 6.

Figure 4:
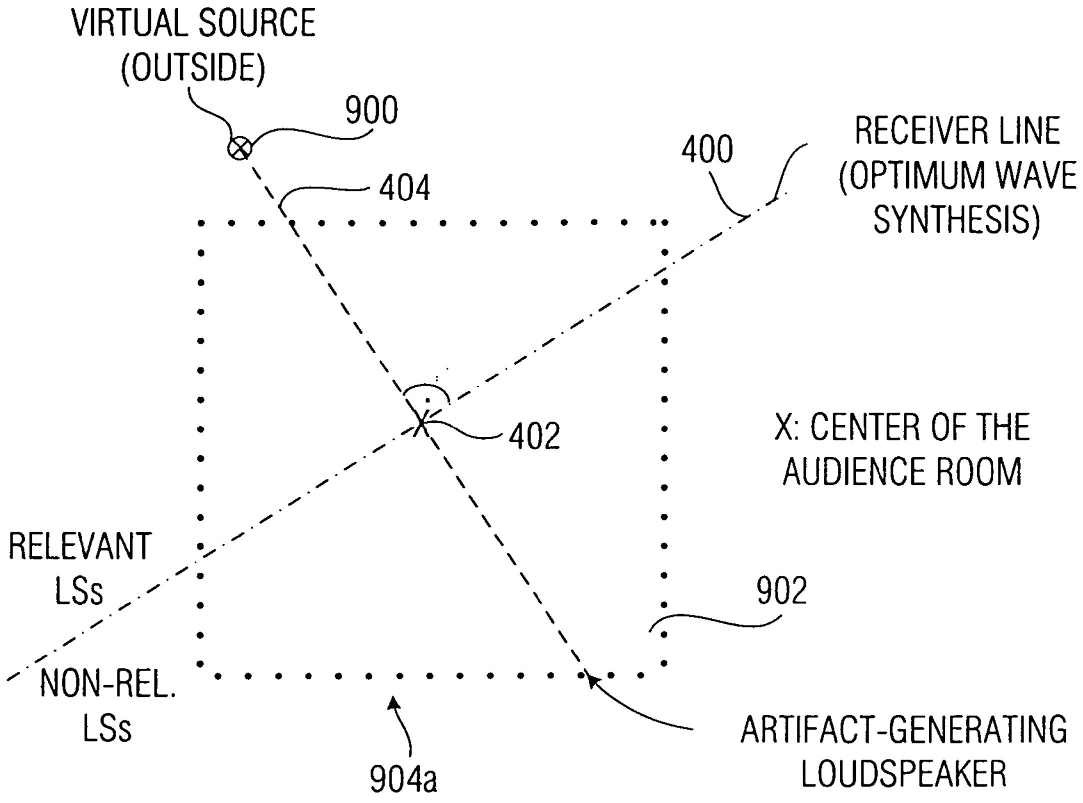
FIG. 4 is an illustration of the situation with a virtual source outside the audience room for characterization of the relevant loudspeakers and the non-relevant loudspeakers for the virtual source.

In FIG. 4, an audience room 902 is illustrated, wherein the virtual source 900, however, is outside the audience room. Furthermore, in FIG. 4, a receiver line 400 is illustrated, which is designed such that an optimum wave synthesis takes place thereon. In a preferred embodiment of the present invention, the receiver line 400, which is calculated individually for each virtual source, is defined so that it passes through the center 402 of the audience room on the one hand and is perpendicular to a line 404 extending from the virtual source 900 to the center 402 of the audience room on the other hand. The receiver line 400 forms the boundary between the relevant loudspeakers, which are on the side of the receiver line 400 facing the virtual source 900, and the non-relevant loudspeakers, which are on the other side of the receiver line. The determination of the loudspeakers lying above the receiver line 400 as relevant loudspeakers (preferably taking the 90° criterion for virtual sources outside the room into account, which will be gone into later) ensures that at least all loudspeakers of the loudspeaker subarray 904*a* emitting loudspeaker signals having a component parallel to the line 404 but directed opposite to the direction from the virtual source 900 to the center of the audience room are not imparted with drive signal components. Since the virtual source is at the position shown in FIG. 4, artifact-reduced or even artifact-free reproduction is achieved when the listener, who is for example disposed on the receiver line and, in particular, at the center of the audience room as defined listener position, feels that the sound comes from the direction of the virtual source 900 and not in some way "from behind", when the listener at the defined listener position 402 looks in the direction of the virtual source 900. Thus, it is an artifact that the listener, although seeing the virtual source in front of him or her, perceives a wave front propagating from his or her back to his or her front side.

Furthermore, it should be pointed out that for all loudspeakers lying beyond the receiver line, i.e. for the loudspeakers on the side of the receiver line 400 facing away from the virtual source 900, application of the usual wave field synthesis forms for the calculation of the scaling is problematic.

Figure 5:
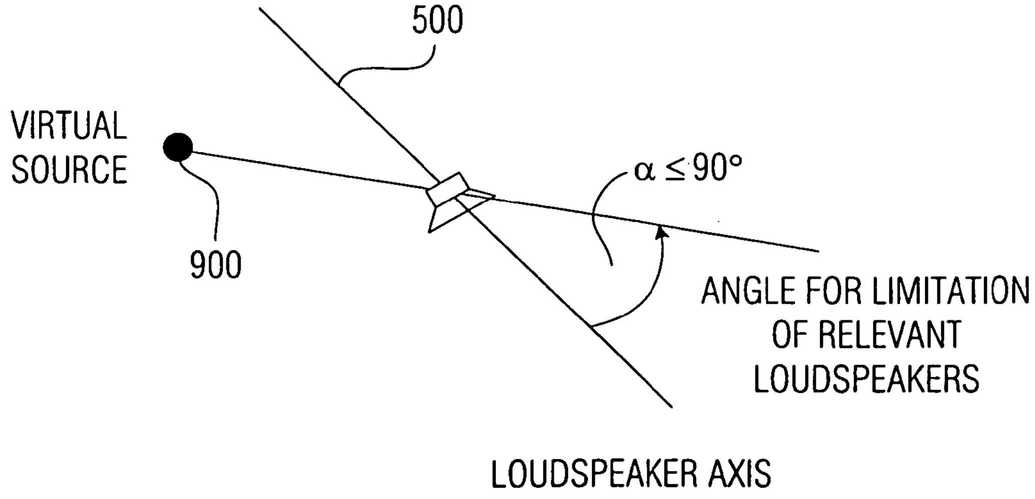
FIG. 5 is an illustration of the angular relation between a virtual source and a loudspeaker axis.

Furthermore, for sources outside the room, it is preferred that only the loudspeakers in which the angle between a loudspeaker axis 500 and a line from the virtual source 900 to the loudspeaker is not greater than 90 degrees are determined as relevant loudspeakers, since this loudspeaker will otherwise not provide an artifact-free contribution for the virtual source 900, as illustrated on the basis of FIG. 5. It is preferred to determine as relevant loudspeakers only the loudspeakers in which the angle $\alpha$, as it is drawn in FIG. 5, is smaller than or equal to 90 degrees.

Figure 6:
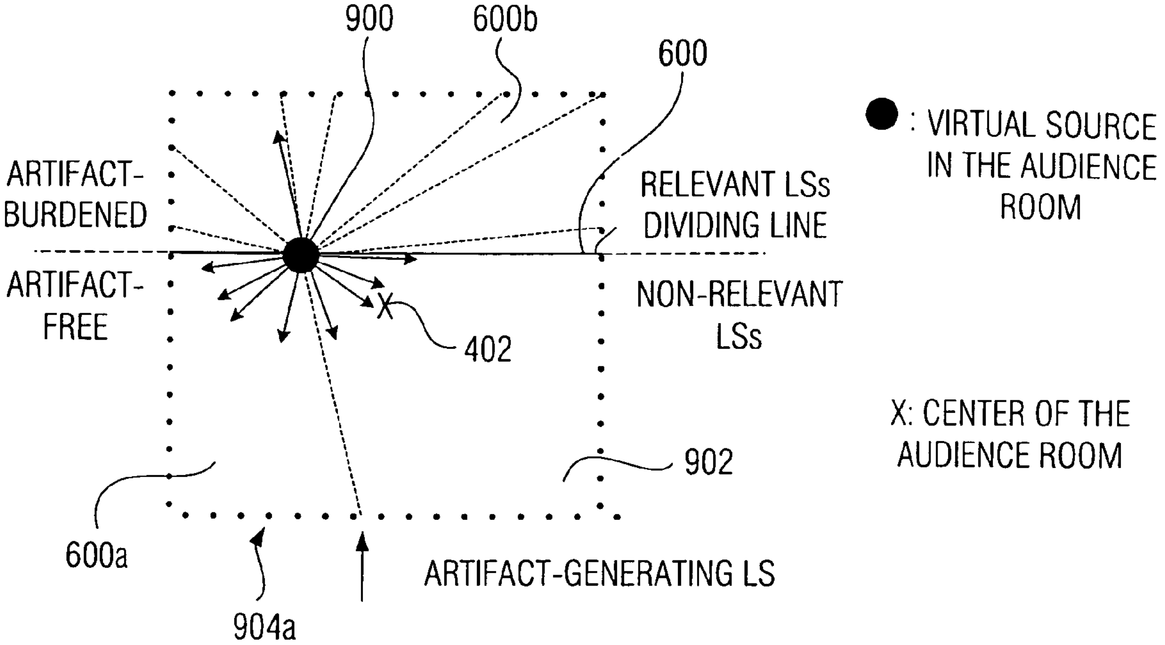
FIG. 6 is an illustration of the situation with a virtual source within the audience room.

Subsequently, on the basis of FIG. 6, it is gone into the situation in which the virtual source 900 is in the audience room. In this respect, the situation in FIG. 6 is similar to the general problem illustrated in FIG. 9. By analogy with FIG. 9, in FIG. 6 also the "generation wave field" is illustrated with dashed lines, whereas the "useful wave field" is illustrated with solid lines closed with an arrowhead. Furthermore, in FIG. 6 also the center 402 of the audience room is drawn in as an example for a defined listener position. Again, a loudspeaker of the lower loudspeaker subarray 904*a* is illustrated as an artifact-generating loudspeaker. In particular, in the example shown in FIG. 6, the audience room is divided, for example, by a dividing line 600 into an artifact-free area 600*a*, in which there is only the useful wave field according to inventive determination of the relative loudspeakers, and into an artifact area 600*b*, in which there is only the generation wave field, but in which there is no useful wave field of the virtual source 900 due to the deactivation of the artifact-generating loudspeakers for the virtual source, but only the generation wave field opposite in direction to the useful wave field.

The 90 degrees boundary illustrated regarding FIG. 5 does not exist in the scenario shown in FIG. 6, in which the virtual source 900 is within the audience room 902, because in principle all loudspeakers can provide a contribution. But since, according to the invention, the listener is not supposed to be between the loudspeakers and the virtual source due to the artifacts of the wave fields propagating with corresponding directions, so as not to hear the "generation" wave field, it is proceeded with the determination of the relevant loudspeakers as it is illustrated subsequently on the basis of FIG. 7. Again, the receiver line 400 is used to separate the relevant loudspeakers from the non-relevant loudspeakers. In particular, the receiver line for the virtual source 900 is again, as it is already explained on the basis of FIG. 4, preferably positioned such that it passes through the center 402 of the audience room or of the wave field synthesis loudspeaker array. Furthermore, again the line 404 from the virtual source 900 to the center 402, which for example is the defined listener position, is constructed to then form a dividing line 600 parallel to the receiver line 400 but passing through the virtual position of the virtual source 900, as can be seen on the basis of FIG. 7. With this, the audience room is again divided into the artifact-free area 600a and the artifact-burdened area 600*b*, wherein the artifact-free area 600*a* is the area of the audience room with reference to the dividing line 600 in which the defined listener position 402 is, whereas the artifact-burdened area 600*b* is the area of the audience room in which the defined listener is not.

Figure 7:
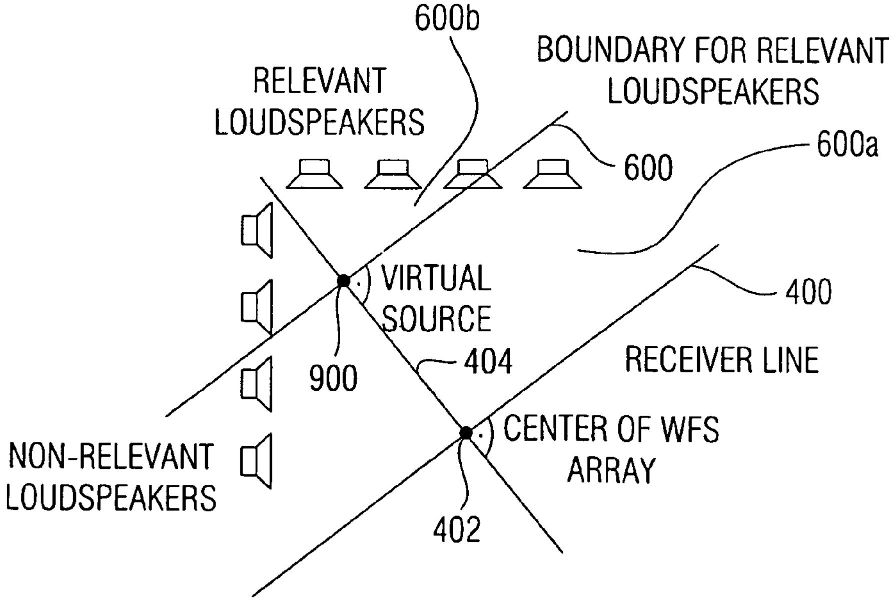
FIG. 7 is a more detailed illustration of the situation of a virtual source within the audience room.

The basis for the definition of the dividing line 600, and thus the relevant loudspeakers on the one hand and the non-relevant loudspeakers on the other hand, is thus, in the embodiment shown in FIG. 7, the laying down of the receiver line for the wave field synthesis, which may take place relatively freely. As it has been set forth, the line for which there is no amplitude error is the receiver line, whereas there will be a slight error for systematic reasons in front of and behind the receiver line due to the fact that the loudspeaker array is not completely three-dimensional.

Furthermore, in the embodiment shown in FIG. 7, the center of the array is chosen as listener position, through which particularly the receiver line is supposed to pass, such that there is no amplitude error at least in the middle of the audience room. Moreover, it is preferred to implement the receiver line as straight, although arbitrary receiver line shapes are possible, as has been stated.

Furthermore, it is preferred to implement the dividing line 600 perpendicularly to the straight line 404 from the virtual source to the center 402, such that the calculation possibility for the wave field synthesis is executable more efficiently due to the thus simplified geometrical conditions.

Furthermore, it is preferred to again choose the line running in parallel to the receiver line but through the virtual source instead of through the array center as limit for the relevant loudspeakers.

As has already been stated, it is preferred to determine the situation of the loudspeakers for each new position of a virtual source, i.e. perform the discrimination between relevant and non-relevant loudspeakers, to achieve an optimum artifact-reduced situation at least in the largest area of the audience room. This however leads to the fact that in the movement of virtual sources loudspeakers are switched on or off due to the change of the boundary between relevant and non-relevant loudspeakers. For the reduction of potentially occurring slight cracking noises particularly in movements from virtual sources in the audience room and in sinusoidal audio signals, it is preferred, in case a loudspeaker has not yet been a relevant loudspeaker at a previous time instant, but has become a relevant loudspeaker due to a moving virtual source, to "softly" switch on this "newly" relevant loudspeaker.

In other words, the level of a loudspeaker newly recognized as relevant is to be brought to its nominal level slowly. The nominal level here is the level or the scaling that means for calculating the drive signal components determines due to the usual wave field synthesis laws. With this, it is ensured that no level jumps occur, particularly when, for example, in sources within the audience room, the position changes strongly, and thus, from one time instant to the next, a loudspeaker will suddenly have a strong signal component due to a virtual source that has not yet been present at the previous time instant.

Depending on implementation, the "soft" switch-on may take place in that, within a period of time of e.g. 10 time instants, i.e. 10 temporal samples of the audio signal, it is gone from a zero level at the time instant of the switch-on of the loudspeaker, i.e. at the time instant of the determination that the loudspeaker is relevant, to the nominal level resulting due to the wave field synthesis calculations.

The detailed choice of the "switch-on time duration" i.e. whether it will be 10 time instants, as stated above, or also only two time instants, or even 20 time instants, will depend, in particular, on the concrete implementation, because also other requirements of the wave field synthesis have to be considered, namely that the overall level of the virtual source should nevertheless be right, and the localizability of the virtual source must not be lost when it is acted too strongly upon the level of the drive signal components due to a virtual source.

In this connection, it is to be pointed out that the inventive manipulations may lead to the fact that drive signal components for non-relevant loudspeakers, which are, as stated above, not provided to the loudspeakers, but which may calculated by a wave field synthesis means, will lead to the fact that an overall perceived reduced level of the audio signal from the virtual source develops. This problem may be counteracted in that the drive signal components for the relevant loudspeakers are raised, to again achieve a certain target level of the virtual source altogether in a way at the "ear" of the listener. In this connection, it is preferred to exclude drive signal components for loudspeakers that still are in the process of switch-on, i.e. that have not yet been relevant for e.g. 10 consecutive time instants, from such a level raise, such that the level of the virtual source is indeed perceived without level variations on the one hand, but that the "soft" switch-on is not put at risk on the other hand.

With reference to the soft switch-on, it is to be pointed out that the amplitude of the drive signal component for a loudspeaker presently being in the process of switch-on may be raised in a step-shaped, linear, sinusoidal or any other manner monotonously over a predetermined number of time instants, depending on present computing resources and implementation wishes.

Depending on the overall conditions, the inventive method of driving an array of loudspeakers with drive signals may be implemented in hardware or in software. The implementation may take place on a digital storage medium, in particular a floppy disc or CD with electronically readable control signals able to cooperate with a programmable computer system so that the method is executed. In general, the invention thus also consists in a computer program product with program code stored on a machine-readable carrier for performing the inventive method, when the computer program product is executed on a computer. In other words, the invention may thus also be realized as a computer program with program code for performing the method of driving an array of loudspeakers, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A wave field synthesis apparatus for driving an array of loudspeakers with drive signals, the loudspeakers being arranged at different defined positions, a drive signal for a loudspeaker being based on an audio signal associated with a virtual source having a virtual position with reference to the loudspeaker array and the defined position of the loudspeaker, comprising:

a determinator for determining relevant loudspeakers of the loudspeaker array on the basis of the position of the virtual source, a predefined listener position, and the defined positions of the loudspeakers, such that artifacts due to loudspeaker signals moving opposite to a direction from the virtual source to the predefined listener position are reduced;

a calculator for calculating the drive signal components for the relevant loudspeakers and the virtual source; and a provider for providing the drive signal components for the relevant loudspeakers for the virtual source to the relevant loudspeakers, wherein no drive signals for the virtual source are provided to loudspeakers of the loudspeaker array not belonging to the relevant loudspeakers, wherein the determinator is configured for calculating a first receiver line for a first virtual source and a second receiver line for a second virtual source, the second virtual source being different from the first virtual source, wherein a receiver line defines positions of optimum wave field reconstruction for a virtual source, wherein the determinator is formed to detect, for each virtual source, whether the virtual position of the virtual source is outside or inside an audience room defined by the loudspeaker array, wherein, in the case of the virtual position of a virtual source being outside the audience room, only loudspeakers being positioned between the virtual position of the virtual source and the receiver line for the virtual source are determined as relevant loudspeakers for the virtual source, and wherein, in the case of the virtual position of a virtual source being inside the audience room, only loudspeakers being positioned on a side of a reference line of the virtual source being different from the side of the reference line, on which the receiver line for the virtual source is located, the reference line being parallel to the receiver line and passing through the virtual position of the virtual source, are determined as relevant.

2. The wave field synthesis apparatus of claim 1, wherein the receiver line for each virtual source extends through a center of the audience room.

3. The wave field synthesis apparatus of claim 2, wherein the receiver line is a straight line.

4. The wave field synthesis apparatus of claim 1, wherein the virtual position of the virtual source is time-variable, and wherein the calculator is formed to calculate the drive signal components for the virtual source and for a loudspeaker so that a drive signal component for a loudspeaker not relevant at a previous time instant and relevant at a current time instant is attenuated by a predetermined attenuation measure with reference to a nominal level.

5. The wave field synthesis apparatus of claim 4, wherein the calculator is formed to reduce the attenuation measure step by step within a predetermined number of time instants from a maximum attenuation to an attenuation equal to 0.

6. The wave field synthesis apparatus of claim 5, wherein the predetermined number of time instants is greater than 2 and smaller than 40.

7. The wave field synthesis apparatus of claim 4, wherein a target level is associated with the virtual source, and wherein the drive signal components for the virtual source for loudspeakers being relevant loudspeakers at the previous time instant and at the current time instant are amplified in level, in order to compensate for the attenuation due to the predetermined attenuation measure regarding the level of the virtual source.

8. A method of driving an array of loudspeakers with drive signals, the loudspeakers being arranged at different defined positions, a drive signal for a loudspeaker being based on an audio signal associated with a virtual source having a virtual position with reference to the loudspeaker array and on the defined position of the loudspeaker, the method comprising:

determining relevant loudspeakers of the loudspeaker array on the basis of the position of the virtual source, a predefined listener position, and the defined positions of the loudspeakers, such that artifacts due to loudspeaker signals moving opposite to a direction from the virtual source to the predefined listener position are reduced;

calculating the drive signal components for the relevant loudspeakers and the virtual source; and providing the drive signal components for the relevant loudspeakers for the virtual source to the relevant loudspeakers, wherein no drive signals for the virtual source are provided to loudspeakers of the loudspeaker array not belonging to the relevant loudspeakers, wherein the step of determining comprises calculating a first receiver line for a first virtual source and a second receiver line for a second virtual source, the second virtual source being different from the first virtual source, wherein a receiver line defines positions of optimum wave field reconstruction for a virtual source, wherein the step of determining comprises detecting, for each virtual source, whether the virtual position of the virtual source is outside or inside an audience room defined by the loudspeaker array, wherein, in the case of the virtual position of a virtual source being outside the audience room, only loudspeakers being positioned between the virtual position of the virtual source and the receiver line for the virtual source are determined as relevant loudspeakers for the virtual source, and wherein, in the case of the virtual position of a virtual source being inside the audience room, only loudspeakers being positioned on a side of a reference line of the virtual source being different from the side of the reference line, on which the receiver line for the virtual source is located, the reference line being parallel to the receiver line and passing through the virtual position of the virtual source, are determined as relevant.

9. Digital storage medium having stored thereon a computer program with program code for performing, when the program is executed on a computer, the method of driving an array of loudspeakers with drive signals, the loudspeakers being arranged at different defined positions, a drive signal for a loudspeaker being based on an audio signal associated with a virtual source having a virtual position with reference to the loudspeaker array and on the defined position of the loudspeaker, the method comprising:

determining relevant loudspeakers of the loudspeaker array on the basis of the position of the virtual source, a predefined listener position, and the defined positions of the loudspeakers, such that artifacts due to loudspeaker signals moving opposite to a direction from the virtual source to the predefined listener position are reduced;

calculating the drive signal components for the relevant loudspeakers and the virtual source; and providing the drive signal components for the relevant loudspeakers for the virtual source to the relevant loudspeakers, wherein no drive signals for the virtual source are provided to loudspeakers of the loudspeaker array not belonging to the relevant loudspeakers, wherein the step of determining comprises calculating a first receiver line for a first virtual source and a second receiver line for a second virtual source, the second virtual source being different from the first virtual source, wherein a receiver line defines positions of optimum wave field reconstruction for a virtual source, wherein the step of determining comprises detecting, for each virtual source, whether the virtual position of the virtual source is outside or inside an audience room defined by the loudspeaker array, wherein, in the case of the virtual position of a virtual source being outside the audience room, only loudspeakers being positioned between the virtual position of the virtual source and the receiver line for the virtual source are determined as relevant loudspeakers for the virtual source, and wherein, in the case of the virtual position of a virtual source being inside the audience room, only loudspeakers being positioned on a side of a reference line of the virtual source being different from the side of the reference line, on which the receiver line for the virtual source is located, the reference line being parallel to the receiver line and passing through the virtual position of the virtual source, are determined as relevant.

* * * * *